United States Patent
Mao et al.

(10) Patent No.: US 11,170,809 B1
(45) Date of Patent: Nov. 9, 2021

(54) TRANSVERSE BIAS STRENGTH ENHANCEMENT IN DUAL FREE LAYER TUNNEL MAGNETORESISTIVE READ HEADS

(71) Applicant: Western Digital Technologies, Inc., San Jose, CA (US)

(72) Inventors: Ming Mao, Dublin, CA (US); Chen-Jung Chien, Mountain View, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/907,031

(22) Filed: Jun. 19, 2020

(51) Int. Cl.
*G11B 5/39* (2006.01)

(52) U.S. Cl.
CPC ............ *G11B 5/398* (2013.01); *G11B 5/3909* (2013.01); *G11B 5/3912* (2013.01); *G11B 5/3932* (2013.01); *G11B 5/3954* (2013.01); *G11B 5/3967* (2013.01); *G11B 5/3974* (2013.01); *G11B 2005/3996* (2013.01)

(58) Field of Classification Search
None
See application file for complete search history.

(56) References Cited

U.S. PATENT DOCUMENTS

| | | | |
|---|---|---|---|
| 8,390,963 B2 | 3/2013 | Dimitrov et al. | |
| 8,670,218 B1 | 3/2014 | Zeltser et al. | |
| 8,749,926 B1 | 6/2014 | Le et al. | |
| 9,099,122 B2 | 8/2015 | Jiang et al. | |
| 9,147,404 B1 | 9/2015 | Luo et al. | |
| 9,153,258 B2 | 10/2015 | Le et al. | |
| 9,922,672 B1 | 3/2018 | Mauri et al. | |
| 2011/0014390 A1 | 1/2011 | Zhou et al. | |
| 2014/0057133 A1* | 2/2014 | Boonstra | G11B 5/3932 428/810 |

(Continued)

OTHER PUBLICATIONS

Ho, Michael, K.; "Study of Magnetic Tunnel Junction Read Sensors"; IEEE Transactions on Magnetics, vol. 37, No. 4, Jul. 2001 (4 pages).

(Continued)

*Primary Examiner* — Craig A. Renner
(74) *Attorney, Agent, or Firm* — Patterson & Sheridan, LLP; Steven H. Versteeg

(57) ABSTRACT

The present disclosure generally related to read heads having dual free layer (DFL) sensors. The DFL sensor and has a surface at the media facing surface (MFS). Behind the DFL sensor away from the MFS, is a rear hard bias (RHB) structure. The RHB structure is disposed between the shields as well. In between the DFL sensor and the RHB structure is insulating material. The insulating material is a multilayer structure. A first layer of the multilayer structure is composed of the same material as the tunnel magnetoresistive barrier layer, such as MgO, and is disposed adjacent the DFL sensor, yet spaced from the RHB structure. A second layer of the multilayer structure is a different insulating layer that is disposed adjacent the RHB structure, yet spaced from the DFL sensor. The multilayer structure helps improve areal density without degrading head stability and performance reliability by maintaining RHB coercivity.

20 Claims, 8 Drawing Sheets

(56) References Cited

U.S. PATENT DOCUMENTS

| | | |
|---|---|---|
| 2014/0178713 A1 | 6/2014 | Le et al. |
| 2015/0154990 A1* | 6/2015 | Jiang et al. .......... G11B 5/3932 |
| | | 428/811.2 |
| 2016/0055868 A1* | 2/2016 | Gao et al. ............... G11B 5/397 |
| | | 360/319 |
| 2017/0249959 A1 | 8/2017 | Bertero et al. |

OTHER PUBLICATIONS

Maat S., Marley A C et al.; Physics and Design of Hard Disk Drive Magnetic Recording Read Heads. Handbook of Spintronics. Springer, Dordrecht (2016).

* cited by examiner

TRANSVERSE BIAS STRENGTH ENHANCEMENT IN DUAL FREE LAYER TUNNEL MAGNETORESISTIVE READ HEADS

BACKGROUND OF THE DISCLOSURE

Field of the Disclosure

Embodiments of the present disclosure generally relate to a dual free layer (DFL) tunnel magnetic resistive (TMR) read head.

Description of the Related Art

Read heads typically include an antiferromagnetic (AFM) layer, which results in a fairly large spacing between shields. A read head without an AFM layer can shrink the distance between shields.

One such read head is a dual free layer (DFL) read head that has a DFL sensor. A DFL read head does not have an AFM layer, but instead has the two free layers individually stabilized longitudinally by antiferromagnetically coupled (AFC) soft bias (SB) structures on either side of the sensor between the shields. The DFL sensor operates in a scissor mode when transversally biased at the stripe back edge by a permanent magnetic or rear hard bias (RHB) structure that delivers twice as high of a readout amplitude with self-noise cancellation. One major challenge in a DFL read head is that the RHB provides a strong field to enable the free layers to operate in the scissor mode.

An insulating layer is present between the RHB and the DFL sensor. The insulating layer serves as the stripe back edge insulator to avoid shunting between the two. To obtain higher areal density, two dimensional magnetic recording (TDMR) is used. To ensure that TDMR can reach higher areal densities, the read junction insulator needs to be chemically compatible with the barrier of a tunnel magnetoresistive (TMR) sensor to enable lower TMR resistance-area product (RA) and higher TMR value. In particular, the degradation due to chemical intermixing between the junction insulator and the TMR barrier made of different atomic elements can be prevented for the already formed lower read head during the full film annealing for the upper read head. TMR sensors, which include MgO as a barrier layer, show great performance because of the higher TMR value and signal to noise ratio, and are currently the industrial standard for read heads. However, MgO, when used as the read junction insulator to ensure chemically compatible to the MgO TMR barrier, has a negative impact upon RHB coercivity. Thus, while an MgO junction insulator is chemically compatible to the TMR barrier and beneficial to achieving higher areal densities, the benefits are offset by the degradation in head stability and performance reliability because of reduced RHB coercivity.

Therefore, there is a need in the art for an improved DFL read head structure to achieve higher areal density without sacrificing head stability and performance reliability due to lower RHB coercivity.

SUMMARY OF THE DISCLOSURE

The present disclosure generally relates to read heads having dual free layer (DFL) sensors. The read head has a sensor disposed between two shields. The sensor is a DFL sensor and has a surface at the media facing surface (MFS). Behind the DFL sensor, and away from the MFS, is a rear hard bias (RHB) structure. The RHB structure is disposed between the shields as well. In between the DFL sensor and the RHB structure is insulating material. The insulating material is a multilayer structure. A first layer of the multilayer structure is composed of the same material as the tunnel magnetoresistive barrier layer, such as MgO, and is disposed adjacent the DFL sensor, yet spaced from the RHB structure. A second layer of the multilayer structure is composed of a different insulating material and is disposed adjacent the RHB structure, yet spaced from the DFL sensor. The multilayer structure helps improve the performance of the DFL sensor with higher areal density without lowering RHB coercivity.

In one embodiment, a magnetic read head comprises: a first shield; a second shield spaced from the first shield; a sensor disposed between the first shield and the second shield, wherein the first shield, the second shield, and the sensor each have a surface at a media facing surface (MFS) of the magnetic read head; a rear hard bias (RHB) structure disposed between the first shield and the second shield, and behind the sensor, wherein the RHB structure is spaced from the MFS; and a multilayer insulating structure disposed between the sensor and the RHB structure.

In another embodiment, a magnetic read head comprises: a dual free layer (DFL) sensor; a rear hard bias (RHB) structure; and a multilayer insulating structure coupled between the DFL sensor and the RHB structure, wherein the multilayer insulating structure comprises at least one layer that is composed of the same material as a tunnel magnetoresistive (TMR) barrier.

In another embodiment, a magnetic read head comprises: a first shield; a middle shield; a second shield; a first sensor disposed between the first shield and the middle shield; a second sensor disposed between the middle shield and the second shield; at least one first rear hard bias (RHB) structure disposed between the first shield and the second shield; and a first multilayer insulating structure disposed between the at least one first RHB structure and the first sensor, wherein the first multilayer insulating structure comprises at least one layer that is composed of the same material as a tunnel magnetoresistive (TMR) barrier.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to read heads having dual free layer (DFL) sensors. The read head has a sensor disposed between two shields. The sensor is a DFL sensor and has a surface at the media facing surface (MFS). Behind the DFL sensor, and away from the MFS, is a rear hard bias (RHB) structure. The RHB structure is disposed between the shields as well. In between the DFL sensor and the RHB structure is insulating material. The insulating material is a multilayer structure. A first layer of the multilayer structure is composed of the same materials as the tunnel magnetoresistive barrier layer, such as MgO, and is disposed adjacent the DFL sensor, yet spaced from the RHB structure. A second layer of the multilayer structure is composed of a different insulating material and is disposed adjacent the RHB structure, yet spaced from the DFL sensor. The multilayer structure helps improve the performance of the DFL sensor with higher areal density without lowering RHB coercivity.

Figure 1:
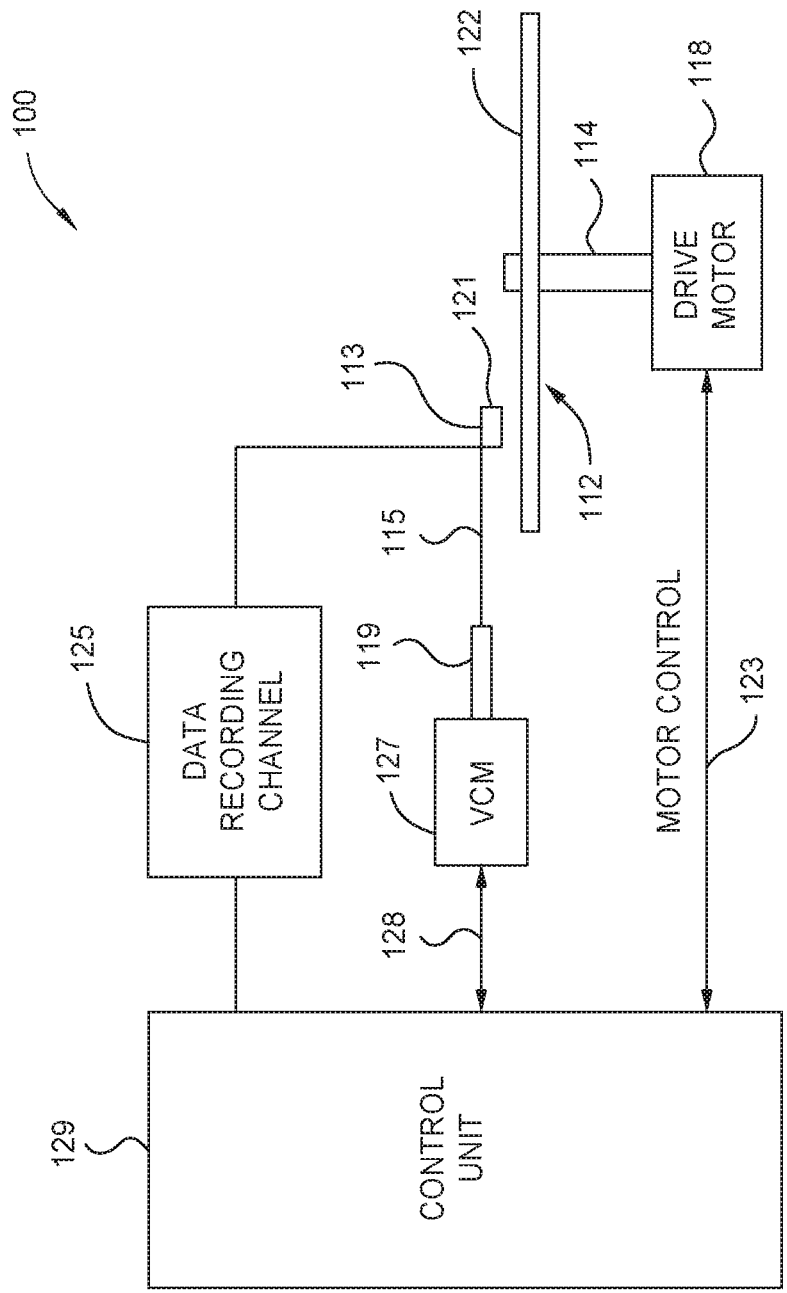
FIG. 1 is a schematic illustration of certain embodiments of a magnetic media drive including a magnetic read head.

FIG. 1 is a schematic illustration of certain embodiments of a magnetic media drive 100 including a magnetic write head and a magnetic read head. The magnetic media drive 100 may be a single drive/device or comprise multiple drives/devices. The magnetic media drive 100 includes a magnetic recording medium, such as one or more rotatable magnetic disk 112 supported on a spindle 114 and rotated by a drive motor 118. For the ease of illustration, a single disk drive is shown according to one embodiment. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read/write heads, such as a write head and a read head comprising a TMR device. As the magnetic disk 112 rotates, the slider 113 moves radially in and out over the disk surface 122 so that the head assembly 121 may access different tracks of the magnetic disk 112 where desired data are written or read. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the magnetic media drive 100, the rotation of the magnetic disk 112 generates an air or gas bearing between the slider 113 and the disk surface 122 which exerts an upward force or lift on the slider 113. The air or gas bearing thus counter-balances the slight spring force of suspension 115 and supports slider 113 off and slightly above the disk surface 122 by a small, substantially constant spacing during normal operation.

The various components of the magnetic media drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
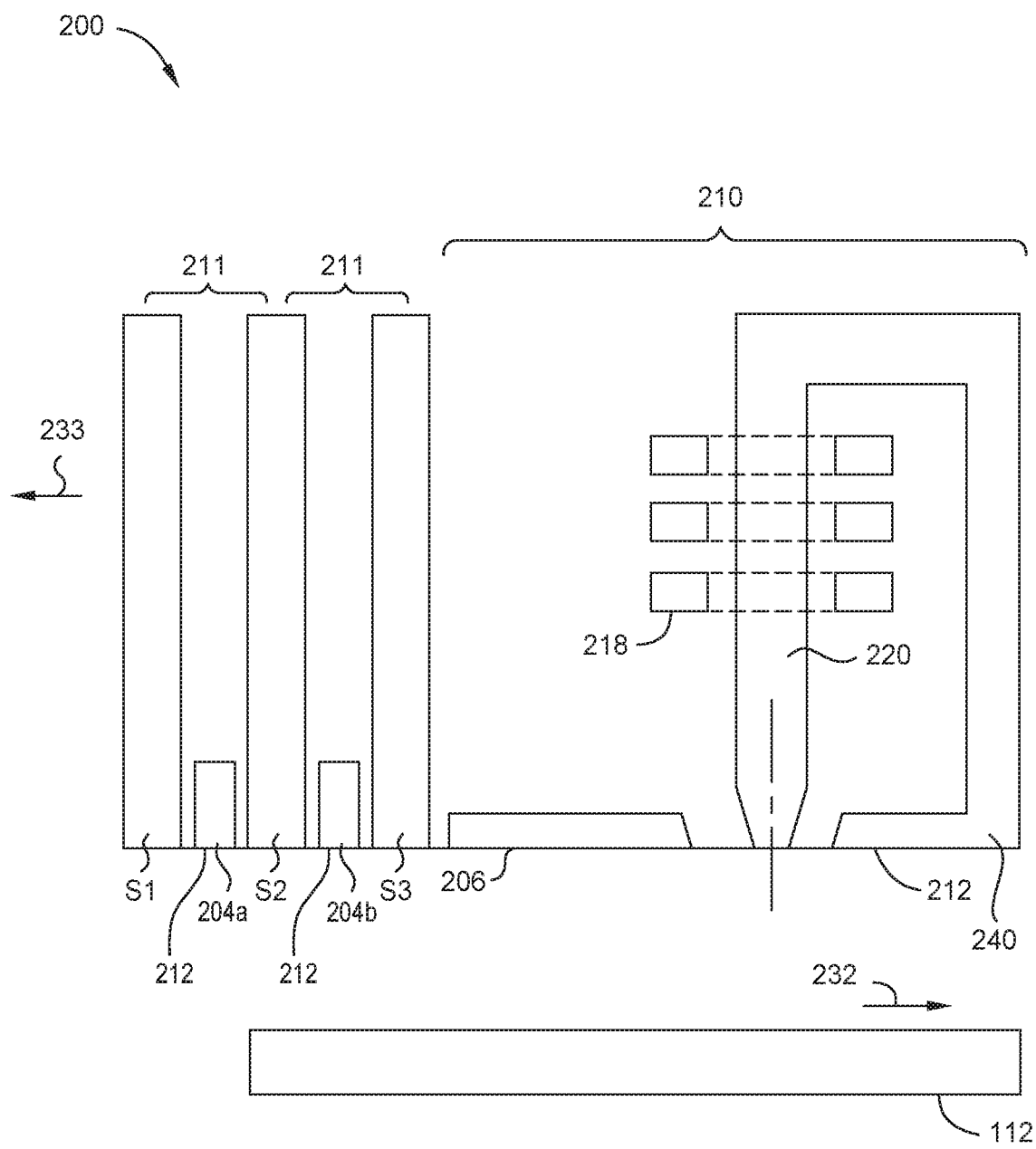
FIG. 2 is a schematic illustration of certain embodiments of a cross sectional side view of a head assembly facing a magnetic storage medium.

FIG. 2 is a schematic illustration of certain embodiments of a cross sectional side view of a head assembly 200 facing the magnetic disk 112 or other magnetic storage medium. The head assembly 200 may correspond to the head assembly 121 described in FIG. 1. The head assembly 200 includes a media facing surface (MFS) 212 facing the magnetic disk 112. As shown in FIG. 2, the magnetic disk 112 relatively moves in the direction indicated by the arrow 232 and the head assembly 200 relatively moves in the direction indicated by the arrow 233.

The head assembly 200 includes a magnetic read head 211. The magnetic read head 211 includes a first sensing element 204a disposed between shields S1 and S2. The magnetic read head also includes a second sensing element 204b disposed between the shields S2 and S3. The sensing element 204a and the shields S1 and S2 have surfaces at the MFS 212 facing the magnetic disk 112. The sensing element 204b and the shields S2 and S3 have surfaces at the MFS 212 facing the magnetic disk 112. The sensing elements 204a, 204b are TMR devices sensing the magnetic fields of the recorded bits, such as perpendicular recorded bits or longitudinal recorded bits, in the magnetic disk 112 by a TMR effect. In certain embodiments, the spacing between shields S1 and S2 and the spacing between shields S2 and S3 is about 17 nm or less. In the embodiment shown in FIG. 2, the read head 211 is a TDMR read head. It is to be understood that the embodiments discussed herein are applicable to a read head having only one sensor as well.

The head assembly 200 may optionally include a write head 210. The write head 210 includes a main pole 220, a leading shield 206, and a trailing shield (TS) 240. The main pole 220 comprises a magnetic material and serves as a main electrode. Each of the main pole 220, the leading shield 206, and the TS 240 has a front portion at the MFS 212. The write head 210 includes a coil 218 around the main pole 220 that excites the main pole 220 producing a writing magnetic field for affecting a magnetic recording medium of the rotatable magnetic disk 112. The coil 218 may be a helical structure or one or more sets of pancake structures. The TS 240 comprises a magnetic material, serving as a return pole for the main pole 220. The leading shield 206 may provide electromagnetic shielding and is separated from the main pole 220 by a leading gap 254.

Figure 3A:
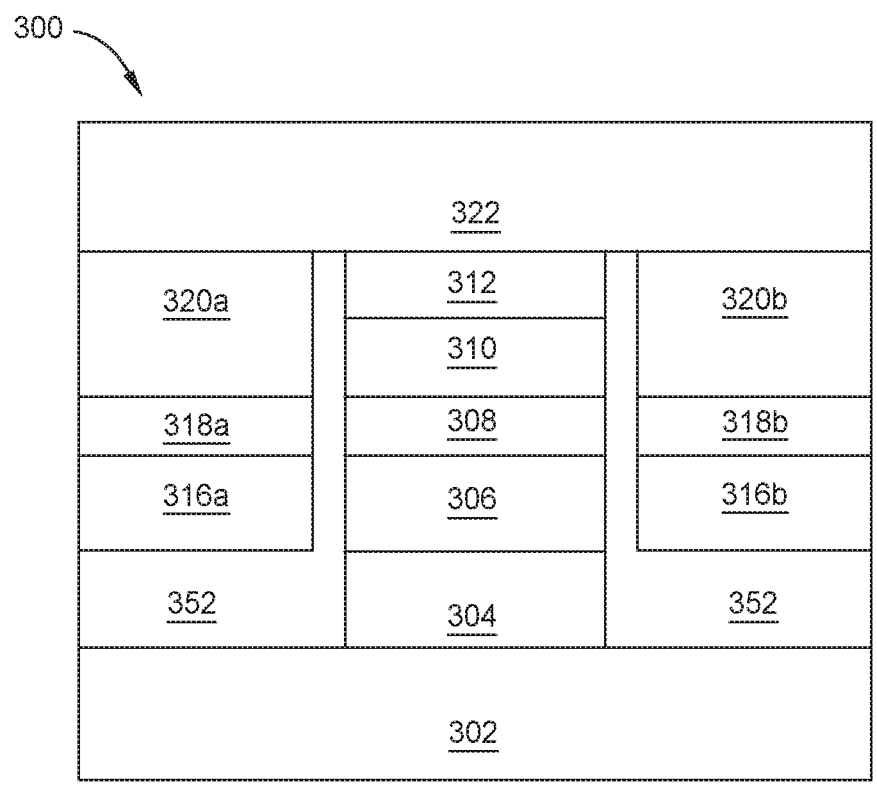
FIGS. 3A-3B are schematic illustrations of a single read head, according to various embodiments.
Figure 3B:
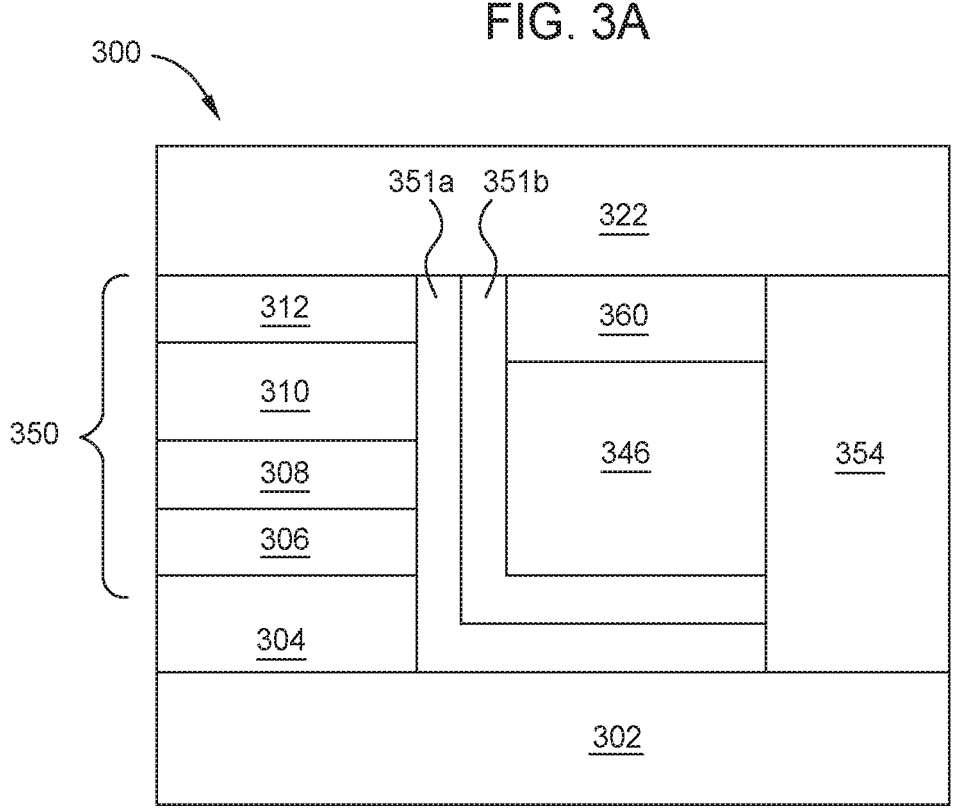

FIGS. 3A-3B are schematic illustrations of a single read head 300. Aspects of FIGS. 3A-3B may be similar to the components of the magnetic read head 211. FIG. 3A is an ABS view of a single read head 300 of a DFL read head. The single read head 300 includes first shield (S1) 302, a seed layer 304, a first free layer (FL) 306, a barrier layer 308, a second FL 310, a cap 312, and a second shield (S2) 322. The single read head 300 further includes a first synthetic antiferromagnetic (SAF) soft bias (SB) (e.g., a side shield) that includes a first lower SB 316*a*, a first spacer 318*a*, and a first upper SB 320*a*. The single read head 300 also includes a second SAF SB that includes a second lower SB 316*b*, a second spacer 318*b*, and a second upper SB 320*b*. The magnetic moments for the first FL 306 and the second FL 310 may be antiparallel due to the antiparallel biasing from the SAF SB. In one embodiment, the first spacer 318*a* and the second spacer 318*b* comprise ruthenium.

S1 302 includes a magnetic permeable and electrically conductive material selected from the group that includes NiFe, CoFe, NiFeCo, and their combinations. S2 322 includes a magnetic permeable and electrically conductive material selected from the same group of materials as S1 302, or the same material exchange biased by a manganese based anti-ferromagnet, such as IrMn, PtMn and NiMn, or the combination of the two. The thickness of each of the S1 302 and the S2 322 may be between about 20 nm and about 500 nm. S1 302 and S2 322 are deposited by well-known deposition methods such as electroplating, electroless plating, or sputtering, or their combinations. Additionally, it is to be understood that while NiFe, CoFe, NiFeCo, IrMn, PtMn and NiMn have been exemplified as S1 302 and S2 322 materials, other materials are contemplated and the embodiments discussed herein are not limited to NiFe, CoFe, NiFeCo, IrMn, PtMn and NiMn for the S1 302 and the S2 322.

A seed layer 304 is formed on the S1 302. The seed layer 304 is deposited by well-known deposition methods such as sputtering. The seed layer 304 includes a material selected from the group that includes tantalum (Ta), ruthenium (Ru), titanium (Ti) and their multilayers or alloys thereof. The seed layer 304 may have a thickness of between about 10 Angstroms to about 50 Angstroms. Additionally, it is to be understood that while Ta, Ru, Ti and their multilayers and alloys have been exemplified as the seed layer 304 materials, other materials are contemplated and the embodiments discussed herein are not limited to Ta, Ru, or Ti or their multilayers or alloys for the seed layer 304.

The first FL 306 is formed on the seed layer 304. The first FL 306 includes a CoFexB/CoFe multilayer stack. The CoFe layer may have a thickness of between about 3 Angstroms to about 10 Angstroms. The CoFexB layer may have a thickness of between about 30 Angstroms to about 100 Angstroms and x between 0 and 1. The first FL 306 may be formed by well-known deposition methods such as sputtering. Additionally, it is to be understood that while CoFexB/CoFe has been exemplified as the first FL 306 material, other materials are contemplated and the embodiments discussed herein are not limited to CoFexB/CoFe/for the first FL 306.

The barrier layer 308 is formed on the first FL 306. The barrier layer 308 includes a material such as magnesium oxide (MgO) with a thickness of between about 10 Angstroms to about 20 Angstroms. It is to be understood that while MgO is exemplified as the barrier layer 308, other insulating materials are contemplated and the embodiments discussed herein are not limited to MgO for the barrier layer 308.

The second FL 310 is formed on the barrier layer 308. The second FL 310 includes a CoFe/CoFexB multilayer stack. The CoFe layer may have a thickness of between about 3 Angstroms to about 10 Angstroms. The CoFexB layer may have a thickness of between about 30 Angstroms to about 60 Angstroms and x between 0 and 1. The second FL 310 may be formed by well-known deposition methods such as sputtering. Additionally, it is to be understood that while CoFe/CoFexB has been exemplified as the second FL 310 material, other materials are contemplated and the embodiments discussed herein are not limited to CoFe/CoFexB for the second FL 310. The magnetic moments for the first FL 306 and the second FL 310 may be antiparallel due to the antiparallel biasing from the SAF SB.

The cap 312 is formed on the second FL 310. The cap 312 includes a material selected from the group that includes tantalum (Ta), ruthenium (Ru), titanium (Ti), other non-magnetic, electrically conductive materials and their multilayers. The cap 312 may be formed by well-known deposition methods such as sputtering. The cap 312 may have a thickness of between about 10 Angstroms to about 100 Angstroms. Additionally, it is to be understood that while Ta, Ru, Ti and their multilayers have been exemplified as the cap 312 materials, other materials are contemplated and the embodiments discussed herein are not limited to Ta, Ru, or Ti or their multilayers for the cap 312.

The single read head 300 further includes a first synthetic antiferromagnetic (SAF) soft bias (SB) (e.g., a side shield) that includes a first lower SB 316*a*, a first spacer 318*a*, and a first upper SB 320*a*. The single read head 300 also includes a second SAF SB that includes a second lower SB 316*b*, a second spacer 318*b*, and a second upper SB 320*b*.

The first lower SB 316*a* and the second lower SB 316*b* include a material selected from the group that includes NiFe, CoFe, CoNi, CoFeNi, CoFeB, Co, and alloys thereof. The first lower SB 316*a* and the second lower SB 316*b* may be formed by well-known deposition methods such as sputtering. The first lower SB 316*a* and the second lower SB 316*b* may each have a thickness of between about 50 Angstroms to about 150 Angstroms. Additionally, it is to be understood that while NiFe, CoFe, CoNi, CoFeNi, CoFeB, and Co have been exemplified as the cap 312 materials, other materials are contemplated and the embodiments discussed herein are not limited to NiFe, CoFe, CoNi, CoFeNi, CoFeB, and Co for the first lower SB 316*a* and the second lower SB 316*b*. The first spacer 318*a* is formed on the first lower SB 316*a* and the second spacer 318*b* is formed on the second lower SB 316*b*. Suitable material for the first spacer 318*a* and the second spacer 318*b* includes ruthenium (Ru) at a thickness of between about 4 Angstroms to about 10 Angstroms. It is to be understood that while Ru has been exemplified as the first spacer 318*a* and the second spacer 318*b* material, other materials are contemplated and the embodiments discussed herein are not limited to Ru for the first spacer 318*a* and the second spacer 318*b*.

The first upper SB 320*a* and the second upper SB 320*b* include a material selected from the group that includes NiFe, CoFe, CoNi, CoFeNi, CoFeB, Co, and alloys thereof. The first upper SB 320*a* and the second upper SB 320*b* may be formed by well-known deposition methods such as sputtering. The first upper SB 320*a* and the second upper SB 320*b* may each have a thickness of between about 50 Angstroms to about 200 Angstroms. Additionally, it is to be understood that while NiFe, CoFe, CoNi, CoFeNi, CoFeB, and Co have been exemplified as the first upper SB 320a and the second upper SB 320b materials, other materials are contemplated and the embodiments discussed herein are not limited to NiFe, CoFe, CoNi, CoFeNi, CoFeB, and Co for the first upper SB 320a and the second upper SB 320b. In various embodiments, a capping layer, similar to the cap 312, may be formed on both the first upper SB 320a and the second upper SB 320b. The capping layer may have a thickness of between about 10 Angstroms to about 100 Angstroms.

Insulation material 352 may be placed in the single read head 300, such that electrical shorting between the S1 302, the seed layer 304, the first FL 306, the barrier layer 308, the second FL 310, the cap 312, the S2 322, the first SAF SB, and the second SAF SB may be avoided. Suitable materials for the insulation material 352 include dielectric materials such as aluminum oxide, magnesium oxide, silicon oxide, and silicon nitride. The insulation material 352 may be formed by well-known deposition methods such as atomic layer deposition (ALD) or sputtering. The insulation material 352 may have a thickness of between about 10 Angstroms to about 50 Angstroms.

In one embodiment, the first lower SB 316a and the second lower SB 316b are identical. Furthermore, in one embodiment, the first upper SB 320a and the second upper SB 320b are identical. Also, in one embodiment, the first spacer 318a and the second spacer 318b are identical.

FIG. 3B is an APEX view of a single read DFL head 300. The single DFL read head 300 further includes a RHB 346, an insulation material 354, a non-magnetic layer 360, and a TMR junction insulation layer 351a. The RHB 346 generates a magnetic field pointing towards the insulation material 354 and away from the following layers: the first FL 306, the barrier layer 308, the second FL 310, and the cap 312. The RHB 346 may include cobalt platinum (CoPt), and is magnetically decoupled from S2 322 by inserting a non-magnetic layer 360 between the RHB 346 and the S2 322. The RHB 346 may comprise a multilayer structure comprising a seed layer(s) and a bulk layer. In one embodiment, the RHB comprises a tantalum seed layer, a tungsten seed layer on the tantalum seed layer, and a CoPt bulk layer disposed on the tungsten seed layer. The non-magnetic cap layer 360 may include a material selected from the group that includes tantalum (Ta), ruthenium (Ru), titanium (Ti), alumina ($Al_2O_3$), silicon dioxide and other non-magnetic materials.

A multilayer insulating structure is located between the DFL sensor stack 350, the shield layer 302, the RHB 346, and the non-magnetic cap layer 360. The multilayer insulating structure includes a first layer 351a and second layer 351b, where each layer includes different materials. The first layer 351a is located adjacent to the DFL sensor stack 350 and the shield layer 302. The second layer 351b is located adjacent to the RHB 346 and the non-magnetic layer 360. In one embodiment, the first layer 351a is composed of the same material as the TMR barrier layer 308 and the second layer 351b is composed of a different insulation material, in one instance, the same as 354. The first layer 351a of the multilayer insulating structure may be referred to as the TMR insulation layer 351a for exemplary purposes. Furthermore, the second layer 351b may be referred to as the RHB underlayer 351b for exemplary purposes.

The TMR insulation layer 351a includes a material such as MgO with a thickness of between about 10 Angstroms to about 50 Angstroms. It is to be understood that while MgO is exemplified as the TMR insulation layer 351a, other insulating materials are contemplated and the embodiments discussed herein are not limited to MgO for the TMR insulation layer 351a. The TMR insulation layer 351a may have a compressive stress greater than the compressive stress of the other layers of the multilayer insulating structure. The TMR insulation layer 351a is deposited by ion beam deposition. The non-conformal coverage nature of ion beam deposition allows thinner insulation layer thickness on the DFL sensor junction thus narrower spacing between DFL sensor stack 350 and the RHB 346.

The TMR insulation layer 351a is deposited adjacent to the DFL sensor stack 350, such that the TMR insulation layer 351a is between the DFL sensor stack 350 and the RHB 346 and the non-magnetic layer 360. Furthermore, the TMR insulation layer 351a is further deposited on the shield layer 302. In one embodiment, the TMR insulation layer 351a is deposited along the entirety of the shield layer 302 that is exposed to the insulation material 354. In another embodiment, the TMR insulation layer 351a extends from the DFL sensor stack 350 to a point vertically aligned with the rear edge (i.e., edge opposite the MFS) of the RHB 346 that is furthest away from the DFL sensor stack 350. In yet another embodiment, the TMR insulation layer 351a extends from the TMR sensor stack 350 to a point between a side of the RHB 346 that is furthest away from the DFL sensor stack 350 and the back edge of a single read head 300.

Suitable materials for the RHB underlayer 351b include dielectric materials such as aluminum oxide ($Al_2O_3$), silicon oxide, and silicon nitride. The RHB underlayer 351b may be formed by well-known deposition methods such as atomic layer deposition (ALD) or sputtering, such as ion beam deposition. The RHB underlayer 351b may have a thickness of between about 5 Angstroms to about 50 Angstroms. The RHB underlayer 351b is located between the TMR insulation layer 351a and the RHB 346 to avoid the degradation of the RHB 346 due to direct contact between the TMR insulation layer 351a and the RHB 346.

Suitable materials for the insulation material 354 include dielectric materials such as aluminum oxide, silicon oxide, and silicon nitride. The insulation material 354 may be formed by well-known deposition methods such as sputtering.

Figure 4A:
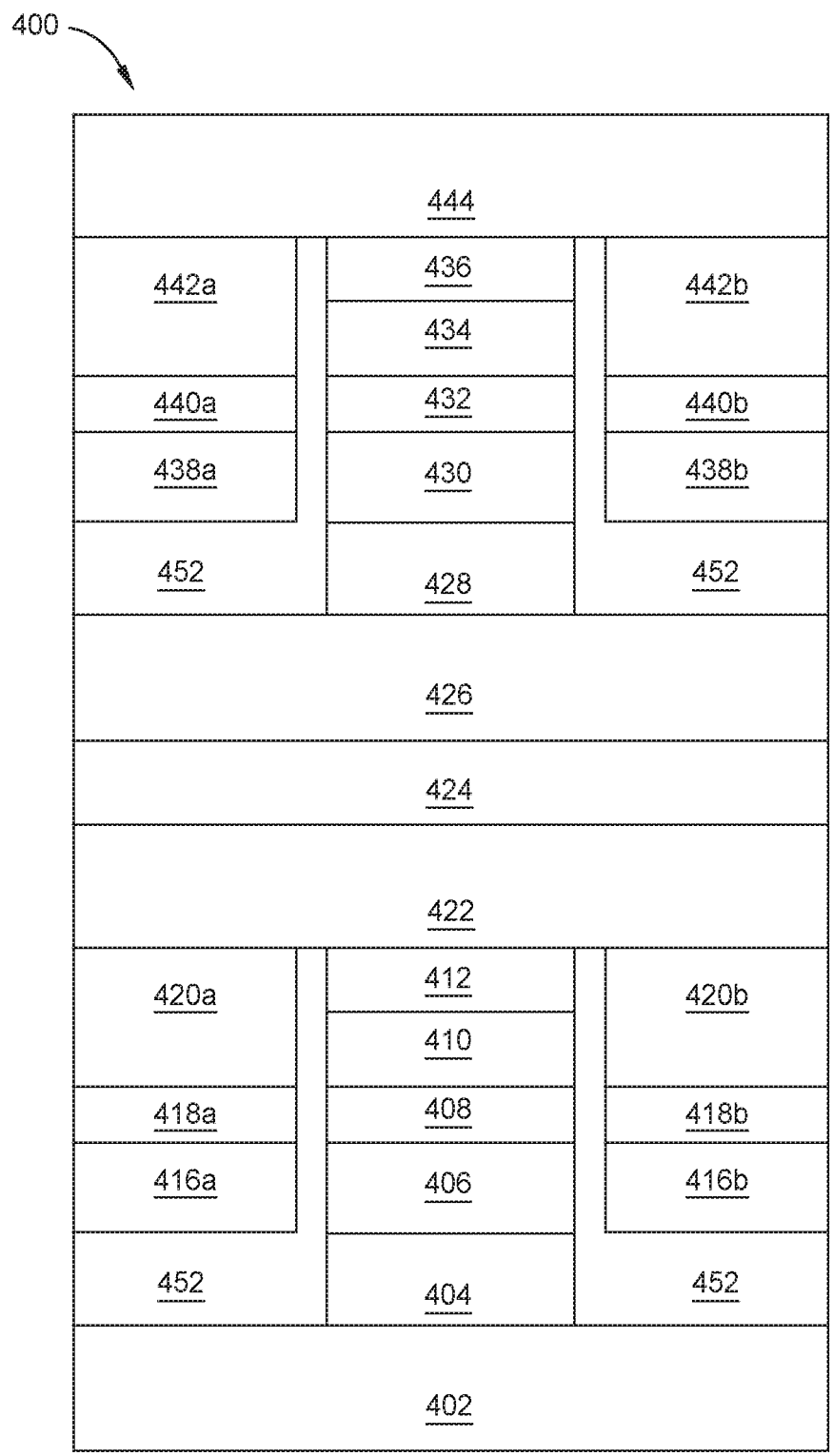
FIGS. 4A-4B are schematic illustrations of a TDMR read head, according to one embodiment.
Figure 4B:
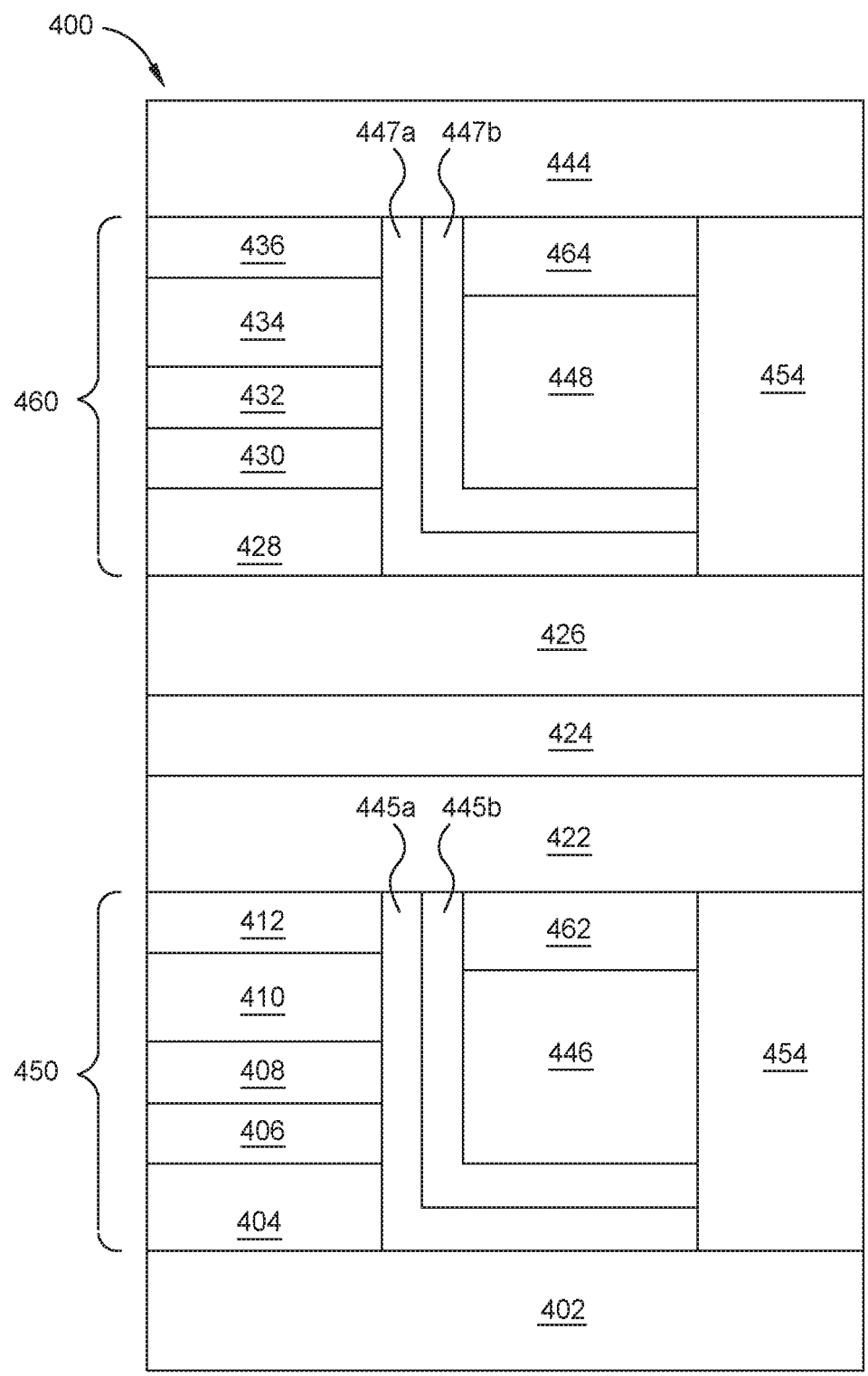

FIGS. 4A-4B are schematic illustrations of a TDMR DFL read head 400 according to one embodiment. Aspects of the FIGS. 3A-3B may be similar to the description of the TDMR read head 400 of FIGS. 4A-4B.

FIG. 4A is an ABS view of a TDMR read head 400, according to one embodiment. The TDMR read head 400 includes a lower DFL read head portion that includes first shield (S1) 402, a seed layer 404, a first free layer (FL) 406, a barrier layer 408, a second FL 410, a cap 412, a second shield (S2) 422, and an insulation material 452. It is understood that other materials not listed for each of the layers described herein are contemplated and the embodiments discussed herein are not limited to the materials listed for each of the layers of the DFL read head. In the embodiments discussed herein, the seed layer, the first FL, the MgO barrier, the second FL, and the cap may be referred to as a DFL sensor stack.

The seed layer 404 includes a material selected from the group that includes tantalum, ruthenium, titanium and combinations thereof. The first DFL read head portion further includes a first SAF SB that includes: a first lower SB 416a, a first spacer 418a, and a first upper SB 420a; and a second SAF SB that includes: a second lower SB 416b, a second spacer 418b, and a second upper SB 420b. The magnetic moments for the first FL 406 and the second FL 410 may be antiparallel due to the antiparallel biasing from the SAF SB.

An insulating read separation gap (RSG) 424 separates the first DFL read head and the second DFL read head. The insulating RSG 424 may be formed by an oxide, such as $Al_2O_3$, or any other suitable insulating material.

The TDMR read head 400 further includes a second DFL read head portion that includes a first shield (S1) 426, a seed layer 428, a first free layer (FL) 430, a barrier layer 432, a second FL 434, a cap 436, a second shield (S2) 444, and an insulation material 452. The seed layer 428 includes a material selected from the group that includes tantalum, ruthenium, titanium and combinations thereof. The second DFL read head portion further includes a first SAF SB that includes: a first lower SB 438a, a first spacer 440a, and a first upper SB 442a; and a second SAF SB that includes: a second lower SB 438b, a second spacer 440b, and a second upper SB 442b. The magnetic moments for the first FL 430 and the second FL 434 may be antiparallel due to the antiparallel biasing from the SAF SB.

FIG. 4B is an APEX view of a TDMR read head 400, according to another embodiment. The first DFL read head portion further includes a RHB 446, an insulation material 454, a non-magnetic layer 462, and a TMR insulation layer 445a. The RHB 446 generates a magnetic field pointing towards the insulation material 454 and away from the following layers: the first FL 406, the barrier layer 408, the second FL 410, and the cap 412. The RHB 446 may include cobalt platinum (CoPt) and one or more seed layers of tantalum and tungsten, and is magnetically decoupled from S2 422 by inserting a non-magnetic layer 462 between the RHB 446 and the S2 422. The non-magnetic layer 462 may include a material selected from the group that includes tantalum (Ta), ruthenium (Ru), titanium (Ti), alumina ($Al_2O_3$), silicon dioxide ($SiO_2$) and other non-magnetic materials.

A multilayer insulating structure is located between the DFL sensor stack 450, the first shield 402, the RHB 446, and the non-magnetic layer 462. The multilayer insulating structure includes a first layer 445a and second layer 445b, where each layer includes different materials. The first layer 445a is located adjacent to the DFL sensor stack 450 and the first shield 402. The second layer 452b is located adjacent to the RHB 446 and the non-magnetic layer 462. In one embodiment, the first layer is composed of the same material as the TMR barrier layer 408 and the second layer is composed of a different insulation material, in one instance, the same as 454. The first layer 445a of the multilayer insulating structure may be referred to as the TMR insulation layer 445a for exemplary purposes. Furthermore, the second layer 445b may be referred to as the RHB underlayer 445b for exemplary purposes.

The TMR insulation layer 445a includes a material such as MgO with a thickness of between about 10 Angstroms to about 50 Angstroms. It is to be understood that while MgO is exemplified as the TMR insulation layer 445a, other insulating materials are contemplated and the embodiments discussed herein are not limited to MgO for the TMR insulation layer 445a. The TMR insulation layer 445a may have a compressive stress greater than the compressive stress of the other layers of the multilayer insulating structure. The TMR insulation layer is deposited by ion beam deposition. The non-conformal coverage nature of ion beam deposition allows thinner insulation layer thickness on the DFL sensor junction thus narrower spacing between DFL sensor and RHB.

The TMR insulation layer 445a is disposed adjacent to the DFL sensor stack 450, such that the TMR insulation layer 445a is disposed between the DFL sensor stack 450 and the RHB 446 and the non-magnetic layer 462. Furthermore, the TMR insulation layer 445a is further disposed on the first shield 402. In one embodiment, the TMR insulation layer 445a is deposited along the entirety of the first shield 402 that is exposed to the insulation material 454. In another embodiment, the TMR barrier layer 445a extends from the DFL sensor stack 450 to a point vertically aligned with side of the RHB 446 that is furthest away from the DFL sensor stack 450. In yet another embodiment, the TMR insulation layer 445a extends from the DFL sensor stack 450 to a point between a side of the RHB 446 that is furthest away from the DFL sensor stack 450 and the back edge of the first DFL read head of the TDMR read head 400.

Suitable materials for the RHB underlayer 445b include dielectric materials such as aluminum oxide ($Al_2O_3$), silicon oxide, and silicon nitride. The RHB underlayer 445b may be formed by well-known deposition methods such as atomic layer deposition (ALD) or sputtering, such as ion beam deposition. The RHB underlayer 445b may have a thickness of between about 5 Angstroms to about 50 Angstroms. The RHB underlayer 445b is located between the TMR insulation layer 445a and the RHB 446 to avoid the degradation of the RHB 446 due to direct contact between the TMR insulation layer 445a and the RHB 446.

Suitable materials for the insulation material 454 include dielectric materials such as aluminum oxide, silicon oxide, and silicon nitride. The insulation material 454 may be formed by well-known deposition methods such as sputtering.

The second DFL read head further includes a RHB 448, an insulation material 454, a non-magnetic layer 464, and a TMR insulation layer 447a. The RHB 448 generates a magnetic field pointing towards the insulation material 454 and away from the following layers: the first FL 430, the barrier layer 432, the second FL 434, and the cap 436. The RHB 448 may include cobalt platinum (CoPt) and one or more seed layers of tantalum and tungsten, and is magnetically decoupled with S2 444 by inserting a non-magnetic layer 464 between the RHB 448 and the S2 444. The non-magnetic layer 464 may include a material selected from the group that includes tantalum (Ta), ruthenium (Ru), titanium (Ti), alumina ($Al_2O_3$), silicon dioxide ($SiO_2$) and other non-magnetic materials.

A multilayer insulating structure is located between the DFL sensor stack 460, the first shield 426, the RHB 448, and the non-magnetic layer 464. The multilayer insulating structure includes a first layer 447a and second layer 447b, where each layer includes different materials. The first layer 447a is located adjacent to the DFL sensor stack 460 and the first shield 426. The second layer 447b is located adjacent to the RHB 448 and the non-magnetic layer 464. In one embodiment, the first layer 447a is composed of the same material as the TMR barrier layer 432 and the second layer 447b is composed of a different insulation material, in one instance, the same as 454. The first layer 447a of the multilayer insulating structure may be referred to as the TMR insulation layer 447a for exemplary purposes. Furthermore, the second layer 447b may be referred to as the RHB underlayer for exemplary purposes.

The TMR insulation layer 447a includes a material such as MgO with a thickness of between about 10 Angstroms to about 50 Angstroms. It is to be understood that while MgO is exemplified as the TMR insulation layer 447a, other insulating materials are contemplated and the embodiments discussed herein are not limited to MgO for the TMR insulation layer 447a. The TMR insulation layer 447a may have a compressive stress greater than the compressive stress of the other layers of the multilayer insulating structure. The TMR insulation layer is deposited by ion beam deposition. The non-conformal coverage nature of ion beam deposition allows thinner insulation layer thickness on the DFL sensor junction thus narrower spacing between DFL sensor and RHB.

The TMR insulation layer 447a is disposed adjacent to the DFL sensor stack 460, such that the TMR insulation layer 447a is disposed between the DFL sensor stack 460 and the RHB 448 and the non-magnetic layer 464. Furthermore, the TMR insulation layer 447a is further disposed on the first shield 426. In one embodiment, the TMR insulation layer 447a is disposed along the entirety of the first shield 426 that is exposed to the insulation material 454. In another embodiment, the TMR insulation layer 447a extends from the DFL sensor stack 460 to a point vertically aligned with a surface of the RHB 448 that is furthest away from the DFL sensor stack 460. In yet another embodiment, the TMR insulation layer 447a extends from the DFL sensor stack 460 to a point between a side of the RHB 448 that is furthest away from the DFL sensor stack 460 and the back edge of the second DFL read head of the TDMR read head 400.

Suitable materials for the RHB underlayer 447b include dielectric materials such as aluminum oxide ($Al_2O_3$), silicon oxide, and silicon nitride. The RHB underlayer 447b may be formed by well-known deposition methods such as atomic layer deposition (ALD) or sputtering, such as ion beam deposition. The RHB underlayer 447b may have a thickness of between about 5 Angstroms to about 50 Angstroms. The RHB underlayer 447b is located between the TMR insulation layer 447a and the RHB 448 to avoid the degradation of the RHB 448 due to direct contact between the TMR insulation layer 447a and the RHB 448.

Figure 5A:
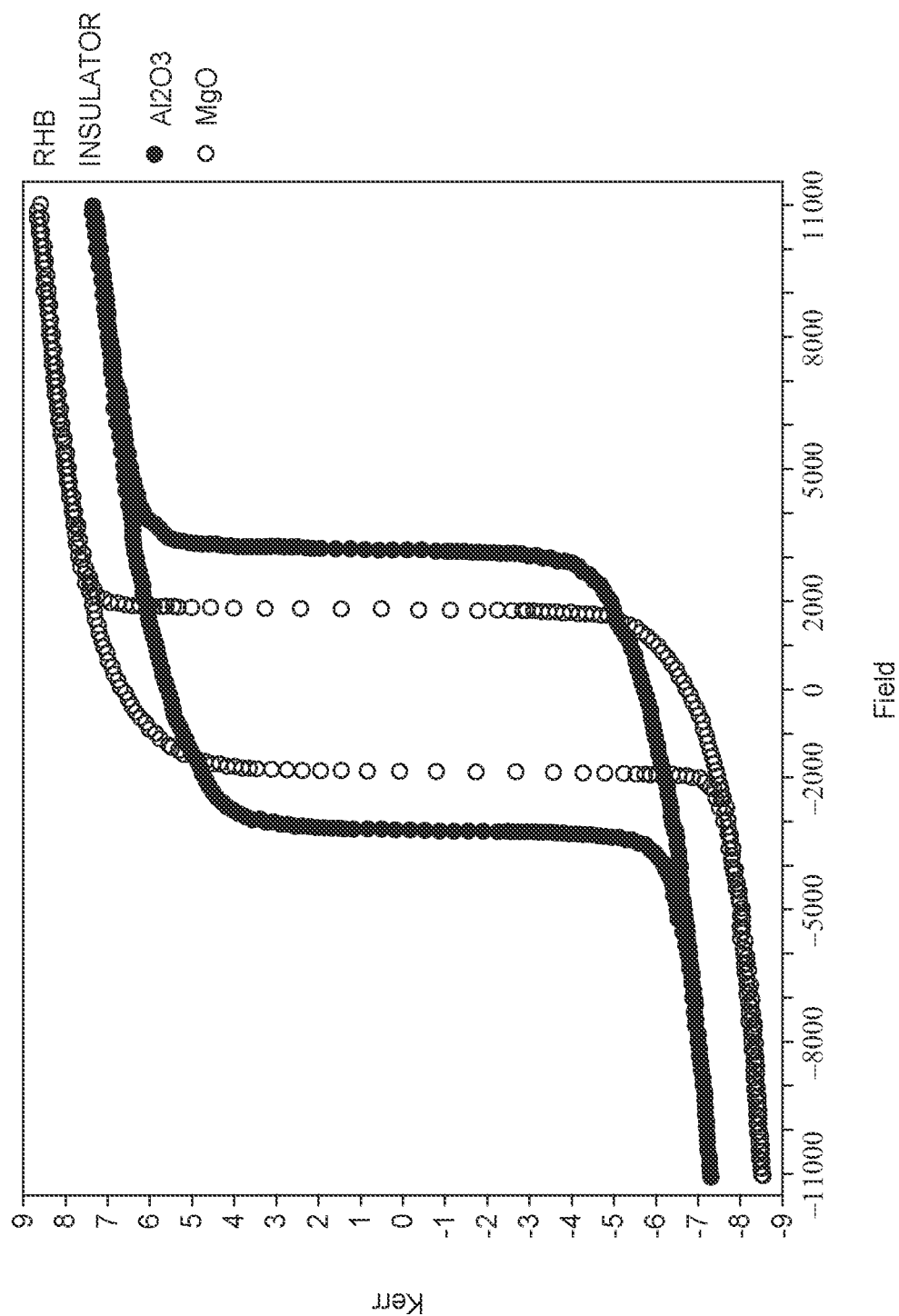
FIGS. 5A-5C are graphs illustrating the magnetic properties of the RHB film, according to various embodiments.

FIG. 5A is a graph illustrating the magnetic properties of the RHB film, according to one embodiment. The magnetic field is graphed on the x-axis and the Kerr signal is graphed on the y-axis. In the current embodiment, the effect of $Al_2O_3$ on the RHB, graphed as the dotted curve, is compared to the effect of MgO on the RHB, graphed as the dashed curve. In the $Al_2O_3$ embodiment, the RHB is grown on the $Al_2O_3$. In the MgO embodiment, the RHB is grown on the MgO. The RHB in the $Al_2O_3$ embodiment can withstand a magnetic field strength of about 2.7 kOe or has a coercivity of 2.7 kOe, whereas the RHB in the MgO embodiment can withstand a magnetic field strength of about 1.7 kOe or has a coercivity of 1.7 kOe. Because the coercivity of the RHB in the MgO embodiment is much less than that of RHB in the $Al_2O_3$ embodiment, the DFL read reliability and performance stability may be degraded in the MgO embodiment. The DFL read reliability and performance stability may be affected by the ease of reversing the RHB magnetic moment due to external magnetic field disturbances.

Figure 5B:
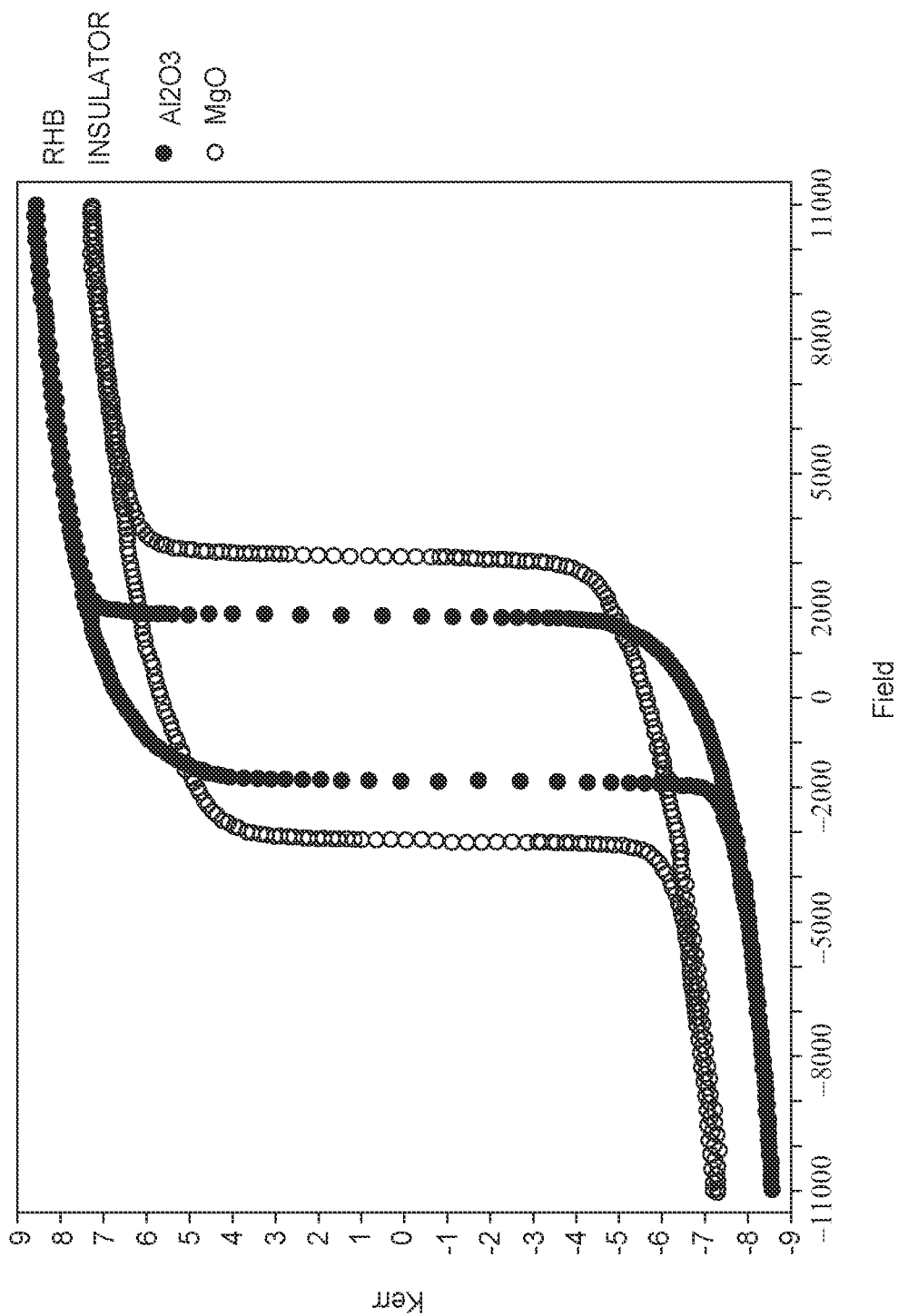

FIG. 5B is a graph illustrating the magnetic properties of the RHB film, according to another embodiment. The magnetic field is graphed on the x-axis and the Kerr signal is graphed on the y-axis. In the current embodiment, the effect of MgO/$Al_2O_3$ on the RHB, graphed as the dashed curve, is compared to the effect of MgO on the RHB, graphed as the dotted curve. In the MgO/$Al_2O_3$ embodiment, the RHB is grown on the MgO/$Al_2O_3$, where the RHB contacts the $Al_2O_3$ layer. In the MgO embodiment, the RHB is grown on the MgO. The MgO/$Al_2O_3$ embodiment can withstand a magnetic field strength of about 2.7 kOe or has a coercivity of about 2.7 kOe, whereas the MgO embodiment can withstand a magnetic field strength of about 1.7 kOe or a coercivity of about 1.7 kOe. The RHB in the MgO/$Al_2O_3$ embodiment has a similar coercivity as that of RHB in the $Al_2O_3$ embodiment of FIG. 5A. Thus, by adding in the $Al_2O_3$ layer to the MgO, the RHB coercivity is improved from that of RHB in the MgO embodiment.

Figure 5C:
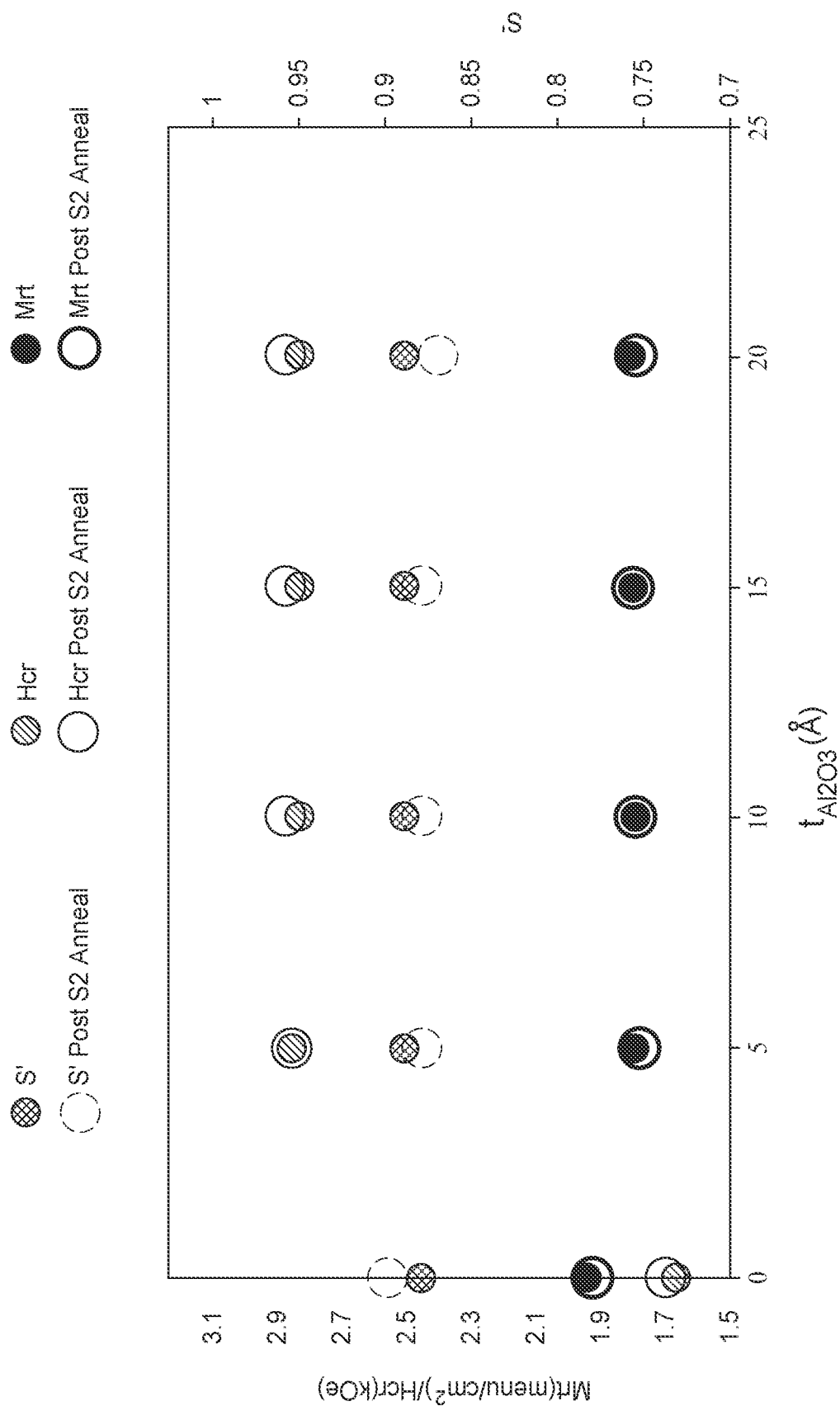

FIG. 5C is a graph illustrating the magnetic properties of the RHB film, according to yet another embodiment. The thickness of the $Al_2O_3$ layer when deposited between the MgO layer and the RHB is graphed on the x-axis. The remnant magnetization thickness product (Mrt), the RHB coercivity (Hcr), and the squareness (S') are graphed on the y-axis. When the thickness of the $Al_2O_3$ layer is 0, the Hcr of the RHB is about 1.7 kOe. However, when the thickness of the $Al_2O_3$ increases to about 5 Angstroms, the Hcr of the RHB increases to about 2.9 kOe. The addition of the $Al_2O_3$ layer to the MgO layer results in a greater Hcr value and may result in an improved DFL read stability and performance reliability.

By using a multilayer insulating structure that comprises at least one layer that is chemically compatible to the TMR barrier and capable of functioning as a TMR insulation layer between the DFL sensor and the RHB structure, high areal density can be achieved without lowering RHB coercivity. The multilayer insulating structure enhances the transverse bias strength. The Hcr value of the RHB is enhanced dramatically without degradation in other magnetic properties such as Mrt and S'. The total thickness of the multilayer insulating structure is kept the same as a single insulation layer, therefore maintaining constant spacing between the sensor and the RHB to ensure constant biasing strength with no sensor shunting. High performance read heads can be manufactured incorporating the multilayer insulating structure enduring both the second shield annealing at 230 degrees Celsius for 60 minutes under a 2 kOe magnetic field in the single DFL read head case and 270 degrees Celsius for 5 hours under a 5 Tesla magnetic field for the TDMR DFL read heads.

In one embodiment, the TMR sensor is used in a camera operating as a single axis sensor. However, it is contemplated that the TMR sensor may be utilized as a two dimensional or even a three dimensional sensor. Additionally, it is contemplated that TMR sensor may be integrated and utilized in inertial measurement unit technologies other than cameras such as wearable devices, compass, and MEMS devices. Furthermore, the TMR sensor may operate as a position sensor, a bridge angular sensor, a magnetic switch, a current sensor, or combinations thereof. The TMR sensor may be used to focus a camera such as a smart phone camera by using the TMR sensors as position and angular sensors. Also, TMR sensors have applicability in the automotive industry as switch, current, and angular sensors to replace current Hall, AMR and GMR sensors. TMR sensors may also be used in the drones and robotics industry as position and angular sensors. Medical devices can also utilize TMR sensors for flow rate control for infusion systems and endoscope camera sensors among others. Thus, the TMR sensors discussed herein have applications well beyond smart phone cameras and thus should not be limited to use as sensors for smart phone cameras. Furthermore, TMR sensors need not be arranged in a Wheatstone bridge arrangement, but rather, may be arranged in any number of manners.

It is to be understood that the magnetic recording head discussed herein is applicable to a data storage device such as a hard disk drive (HDD) as well as a tape drive, such as a tape embedded drive (TED) or an insertable tape media drive. An example TED is described in co-pending patent application entitled "Tape Embedded Drive", U.S. patent application Ser. No. 16/365,034, filed Mar. 31, 2019 and assigned to the same assignee of the instant application. Any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

In one embodiment, a magnetic read head comprises: a first shield; a second shield spaced from the first shield; a sensor disposed between the first shield and the second shield, wherein the first shield, the second shield, and the sensor each have a surface at a media facing surface (MFS) of the magnetic read head; a rear hard bias (RHB) structure disposed between the first shield and the second shield, and behind the sensor, wherein the RHB structure is spaced from the MFS; and a multilayer insulating structure disposed between the sensor and the RHB structure. The multilayer insulating structure is deposited by ion beam sputter deposition. The multilayer insulating structure is disposed between the first shield and the RHB structure. The multilayer insulating structure comprises at least a first layer and a second layer, and wherein the first layer and the second layer comprise different materials. The multilayer insulating structure comprises at least one layer that is chemically compatible to the tunnel magnetoresistive (TMR) barrier and capable of functioning as a TMR insulation layer, and wherein the at least one layer that is capable of functioning as a TMR insulation layer is spaced from the RHB structure. The at least one layer that is chemically compatible to a tunnel magnetoresistive (TMR) barrier and capable of functioning as a TMR insulation layer with a compressive stress that is greater than a compressive stress of all other layers of the multilayer insulating structure. A magnetic recording device comprising the magnetic read head is also contemplated.

In another embodiment, a magnetic read head comprises: a dual free layer (DFL) sensor; a read hard bias (RHB) structure; and a multilayer insulating structure coupled between the DFL sensor and the RHB structure, wherein the multilayer insulating structure comprises at least one layer that is chemically compatible to a tunnel magnetoresistive (TMR) barrier and capable of functioning as a TMR insulation layer. The multilayer insulating structure comprises a first layer and a second layer, wherein the first layer is disposed between the sensor and the second layer, and wherein the first layer comprises MgO. The second layer comprises $Al_2O_3$. The RHB structure comprises CoPt. The at least one layer that is chemically compatible to the TMR barrier and capable of functioning as the TMR insulation layer is spaced from the RHB structure. The at least one layer that is chemically compatible to the TMR barrier and capable of functioning as the TMR insulation layer is in contact with the DFL sensor. A magnetic recording device comprising the magnetic read head is also contemplated.

In another embodiment, a magnetic read head comprises: a first shield; a middle shield; a second shield; a first sensor disposed between the first shield and the middle shield; a second sensor disposed between the middle shield and the second shield; at least one first rear hard bias (RHB) structure disposed between the first shield and the second shield; and a first multilayer insulating structure disposed between the at least one first RHB structure and the first sensor, wherein the first multilayer insulating structure comprises at least one layer that is chemically compatible to a tunnel magnetoresistive (TMR) barrier and capable of functioning as a TMR insulation layer. The magnetic read head further comprises at least one second RHB structure disposed between the middle shield and the second shield; and a second multilayer insulating structure disposed between the at least one second RHB structure and the second sensor, wherein the second multilayer insulating structure comprises at least one layer that is chemically compatible to the TMR barrier and capable of functioning as the TMR insulation layer. The first multilayer insulating structure is disposed between the at least one first RHB structure and the first sensor. The magnetic read head further comprises the first shield, wherein the first multilayer insulating structure is disposed between the first shield and the at least one first RHB structure. The first sensor and the second sensor are dual free layer (DFL) sensors. A magnetic recording device comprising the magnetic read head is also contemplated.

While the foregoing is directed to embodiments of the present disclosure, other and further embodiments of the disclosure may be devised without departing from the basic scope thereof, and the scope thereof is determined by the claims that follow.

What is claimed is:

1. A magnetic read head, comprising:
   a first shield;
   a second shield spaced from the first shield;
   a sensor disposed between the first shield and the second shield, wherein the first shield, the second shield, and the sensor each has a surface at a media facing surface (MFS) of the magnetic read head;
   a rear hard bias (RHB) structure disposed between the first shield and the second shield, and behind the sensor, wherein the RHB structure is spaced from the MFS; and
   a multilayer insulating structure, wherein each layer of the multilayer insulating structure is disposed between the sensor and the RHB structure and sandwiched between the RHB structure and the first shield.

2. The magnetic read head of claim 1, wherein the multilayer insulating structure comprises at least a first layer and a second layer, and wherein the first layer and the second layer comprise different materials.

3. The magnetic read head of claim 1, wherein the multilayer insulating structure comprises at least one layer that is chemically compatible to a tunnel magnetoresistive (TMR) barrier and capable of functioning as a TMR insulation layer, and wherein the at least one layer that is capable of functioning as a TMR insulation layer is spaced from the RHB structure.

4. The magnetic read head of claim 3, wherein the at least one layer that is chemically compatible to the TMR barrier and capable of functioning as a TMR insulation layer has a compressive stress that is greater than a compressive stress of all other layers of the multilayer insulating structure.

5. The magnetic read head of claim 1, wherein the multilayer insulating structure is deposited by ion beam sputter deposition.

6. A magnetic recording device comprising the magnetic read head of claim 1.

7. A sensing element, comprising:
   a dual free layer (DFL) sensor;
   a read hard bias (RHB) structure; and
   a multilayer insulating structure coupled between the DFL sensor and a first surface of the RHB structure, wherein the multilayer insulating structure comprises at least one layer that is chemically compatible to a tunnel magnetoresistive (TMR) barrier and capable of functioning as a TMR insulation layer, and wherein each layer of the multilayer insulating structure extends along the first surface of the RHB structure and a second surface of the RHB structure disposed substantially perpendicular to the first surface.

8. The sensing element of claim 7, wherein the multilayer insulating structure comprises a first layer and a second layer, wherein the first layer is disposed between the sensor and the second layer, and wherein the first layer comprises MgO.

9. The sensing element of claim 8, wherein the second layer comprises $Al_2O_3$.

10. The sensing element of claim 9, wherein the RHB structure comprises CoPt.

11. The sensing element of claim 7, wherein the at least one layer that is chemically compatible to the TMR barrier and capable of functioning as the TMR insulation layer is spaced from the RHB structure.

12. The sensing element of claim 7, wherein the at least one layer that is chemically compatible to the TMR barrier and capable of functioning as the TMR insulation layer is in contact with the DFL sensor.

13. The sensing element of claim 7, wherein each layer of the multilayer insulating structure has a substantially constant thickness.

14. A magnetic recording device comprising the sensing element of claim 7.

15. A magnetic read head, comprising:
a first shield;
a middle shield;
a second shield;
a first sensor disposed between the first shield and the middle shield;
a second sensor disposed between the middle shield and the second shield;
at least one first rear hard bias (RHB) structure disposed between the first shield and the second shield; and
a first multilayer insulating structure comprising at least one layer that is chemically compatible to a tunnel magnetoresistive (TMR) barrier and capable of functioning as a TMR insulation layer, wherein each layer of the first multilayer insulating structure is disposed between the at least one first RHB structure and the first sensor and sandwiched between the at least one first RHB structure and the first shield.

16. The magnetic read head of claim 15, further comprising:
at least one second RHB structure disposed between the middle shield and the second shield; and
a second multilayer insulating structure disposed between the at least one second RHB structure and the second sensor, wherein the second multilayer insulating structure comprises at least one layer that is chemically compatible to the TMR barrier and capable of functioning as the TMR insulation layer.

17. The magnetic read head of claim 16, wherein each layer of the second multilayer insulating structure is disposed between the at least one second RHB structure and the second sensor and sandwiched between the at least one second RHB structure and the middle shield.

18. The magnetic read head of claim 15, wherein the first multilayer insulating structure is disposed between the first shield and the at least one first RHB structure.

19. The magnetic read head of claim 15, wherein the first sensor and the second sensor are dual free layer (DFL) sensors.

20. A magnetic recording device comprising the magnetic read head of claim 15.

* * * * *